United States Patent
Klein et al.

(10) Patent No.: US 10,621,160 B2
(45) Date of Patent: Apr. 14, 2020

(54) STORAGE MANAGEMENT INCONSISTENCY TRACKER

(71) Applicant: International Business Machines Corporation, Armonk, NY (US)

(72) Inventors: Rotem Klein, Kiryat Ono (IL); Daniel Lereya, Tel Aviv-Jaffa (IL); Nadav Parag, Rehovot (IL); Vladimir Shalikashvili, Petah Tiqwa (IL); Moshe Weiss, Petah Tiqwa (IL)

(73) Assignee: International Business Machines Corporation, Armonk, NY (US)

( * ) Notice: Subject to any disclaimer, the term of this patent is extended or adjusted under 35 U.S.C. 154(b) by 180 days.

(21) Appl. No.: 15/474,397

(22) Filed: Mar. 30, 2017

(65) Prior Publication Data

US 2018/0285408 A1 Oct. 4, 2018

(51) Int. Cl.
*G06F 16/00* (2019.01)
*G06F 16/23* (2019.01)
*G06F 16/22* (2019.01)
*G06F 16/11* (2019.01)

(52) U.S. Cl.
CPC ........ *G06F 16/2365* (2019.01); *G06F 16/122* (2019.01); *G06F 16/128* (2019.01); *G06F 16/22* (2019.01)

(58) Field of Classification Search
CPC combination set(s) only.
See application file for complete search history.

(56) References Cited

U.S. PATENT DOCUMENTS

| 7,007,047 B2 | 2/2006 | Zelenka et al. |
| 7,136,883 B2 | 11/2006 | Flamma et al. |
| 7,216,263 B2 * | 5/2007 | Takaoka ........... G06F 3/061 |
| | | 709/224 |

(Continued)

FOREIGN PATENT DOCUMENTS

EP    2157506 A2    2/2010

OTHER PUBLICATIONS

Bermbach, David et al., "MetaStorage: A Federated Cloud Storage System to Manage Consistency-Latency Tradeoffs", IEEE, 2011 IEEE 4th International Conference on Cloud Computing, Jul. 4, 2011, pp. 452-459.

*Primary Examiner* — Farhan M Syed
(74) *Attorney, Agent, or Firm* — Francis Lammes; Stephen J. Walder, Jr.; Robert M. Sullivan

(57) ABSTRACT

A mechanism is provided for managing inconsistencies associated with an object in a storage system. Responsive to the object already being associated with a current object group, a match percentage value is determined between characteristics associated with the object and characteristics of the current object group and, for each other object group in a set of object groups, a match percentage value is identified between characteristics of the object and characteristics of each of the other object groups. Responsive to the match percentage value between the characteristics of the object and one or more other object groups being higher than the match percentage value between the characteristics of the object and the characteristics of the current object group, a notification is sent to an administrator. Responsive to receiving an action to be implemented, the action is implemented to at least one of the object or one or more object groups.

17 Claims, 3 Drawing Sheets

(56) References Cited

U.S. PATENT DOCUMENTS

| | | | | |
|---|---|---|---|---|
| 7,373,476 B2* | 5/2008 | Asano | ............... | G06F 3/0605 |
| | | | | 711/114 |
| 7,809,898 B1* | 10/2010 | Kiselev | ............... | G06F 11/2064 |
| | | | | 711/111 |
| 8,918,677 B1* | 12/2014 | Marokhovsky | ..... | G06F 11/0751 |
| | | | | 707/687 |
| 8,996,467 B2* | 3/2015 | Apte | ............... | G06F 7/00 |
| | | | | 707/640 |
| 9,009,106 B1* | 4/2015 | Aron | ............... | G06F 11/14 |
| | | | | 707/610 |
| 9,218,344 B2* | 12/2015 | Al-Kofahi | ............ | G06F 17/241 |
| 9,367,395 B1* | 6/2016 | Bono | ............... | G06F 16/174 |
| 9,628,473 B1* | 4/2017 | Odom | ............... | G06Q 30/018 |
| 9,658,983 B1 | 5/2017 | Barber et al. | | |
| 2008/0005168 A1* | 1/2008 | Huff | ............... | G06Q 10/109 |
| 2013/0173553 A1* | 7/2013 | Apte | ............... | G06F 7/00 |
| | | | | 707/640 |
| 2014/0006424 A1* | 1/2014 | Al-Kofahi | ............ | G06F 17/241 |
| | | | | 707/754 |
| 2015/0317337 A1* | 11/2015 | Edgar | ............... | G06Q 10/00 |
| | | | | 707/751 |

* cited by examiner

STORAGE MANAGEMENT INCONSISTENCY TRACKER

BACKGROUND

The present application relates generally to an improved data processing apparatus and method and more specifically to mechanisms for managing inconsistencies in a storage system.

Object storage (also known as object-based storage) is a computer data storage architecture that manages data as objects, as opposed to other storage architectures like file systems which manage data as a file hierarchy and block storage which manages data as blocks within sectors and tracks. Each object typically includes the data itself, a variable amount of metadata, and a globally unique identifier. Object storage can be implemented at multiple levels, including the device level (object storage device), the system level, and the interface level. In each case, object storage seeks to enable characteristics not addressed by other storage architectures, like interfaces that can be directly programmable by the application, a namespace that can span multiple instances of physical hardware, and data management functions like data replication and data distribution at object-level granularity. Object storage systems allow retention of massive amounts of unstructured data.

In object storage, objects in a storage system are grouped into object storage groups, where each object storage group is a storage group that defines the physical storage used for objects. For objects, the storage group allows for the definition of an object storage hierarchy. The object storage hierarchy may consist of disk volumes, tape volumes, optical volumes, or the like. While objects within a single group may move up and down a hierarchy within a single storage group, the objects may not move outside of that group. Objects move within the storage hierarchy depending initially on management class and storage class criteria for the object collection, and subsequently on Automatic Class Selection (ACS) routines.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for managing inconsistencies associated with an object in a storage system. The illustrative embodiment determines whether the object is already associated with a current object group in a set of object groups. Responsive to the object already being associated with the current object group, the illustrative embodiment identifies a match percentage value between characteristics in a set of characteristics associated with the object and characteristics in a set of characteristics of the current object group and, for each other object group in a set of object groups, identifies a match percentage value between characteristics in the set of characteristics of the object and characteristics in a set of characteristics of each of the other object groups. The illustrative embodiment determines whether a match percentage value between the characteristics of the object and the one or more other object groups in the set of other object groups is higher than the match percentage value between the characteristics of the object and the characteristics of the current object group. The illustrative embodiment generates a notification to an administrator of the storage system in response to the match percentage value between the characteristics of the object and one or more other object groups in the set of other object groups being higher than the match percentage value between the characteristics of the object and the characteristics of the current object group. The illustrative embodiment implements an action to at least one of the object or one or more object groups in response to receiving the action to be implemented from the administrator. The illustrative embodiment records the action in a heuristics database.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
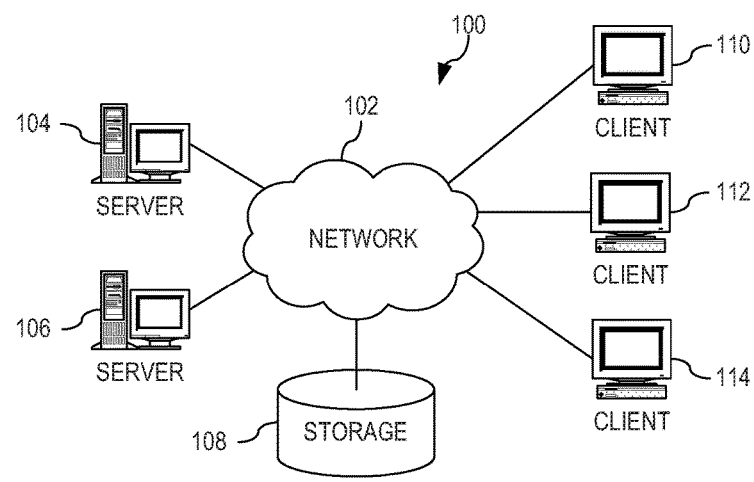
FIG. 1 is an example diagram of a distributed data processing system in which aspects of the illustrative embodiments may be implemented.

The illustrative embodiments provide mechanisms for managing inconsistencies in a storage system. As noted above, objects in a storage system are grouped into object groups, where each object group is an object group that defines the physical storage used for objects. For objects, the object group allows for the definition of an object storage hierarchy. The object storage hierarchy may consist of disk volumes, tape volumes, optical volumes, or the like. While objects within a single group may move up and down a hierarchy within a single storage group, the objects may not move outside of that group.

However, current groupings of objects may be made based on users definition of each object group as well as placing the objects within the object groups themselves, which may result in an object that is improperly grouped. That is, current groupings of objects are performed based on naming conventions using prefixes and/or suffixes. However, using solely a naming convention may cause an object to be incorrectly grouped with another set of objects. Thus, the illustrative embodiments provide mechanisms for managing inconsistencies in a storage system. In the illustrative embodiments, the mechanism check for numerous characteristics associated with the object either prior to the object being grouped or to identify an object that has been grouped incorrectly. The mechanisms identify characteristics such as, for example, where the object is mirrored to, which host the object is mapped to, which consistency group the object is associated with, a snapshot interval of the object, a snapshot rotation of the object, or the like. Based on one or more of these characteristics, the mechanisms identify grouped object that have the same characteristics—like all mirrored to the same place, all mapped to the same host, all in the same CG, all have the same snapshot interval, all have the same snapshot rotation, or the like. If the object is currently being grouped, the mechanisms provide the administrator with an indication of which group best coincides with the characteristics of the object. If the object is already grouped by incorrectly, then the mechanisms provide an alert to an administrator indicating a policy violation as well as an indication of which group best coincides with the characteristics of the object.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
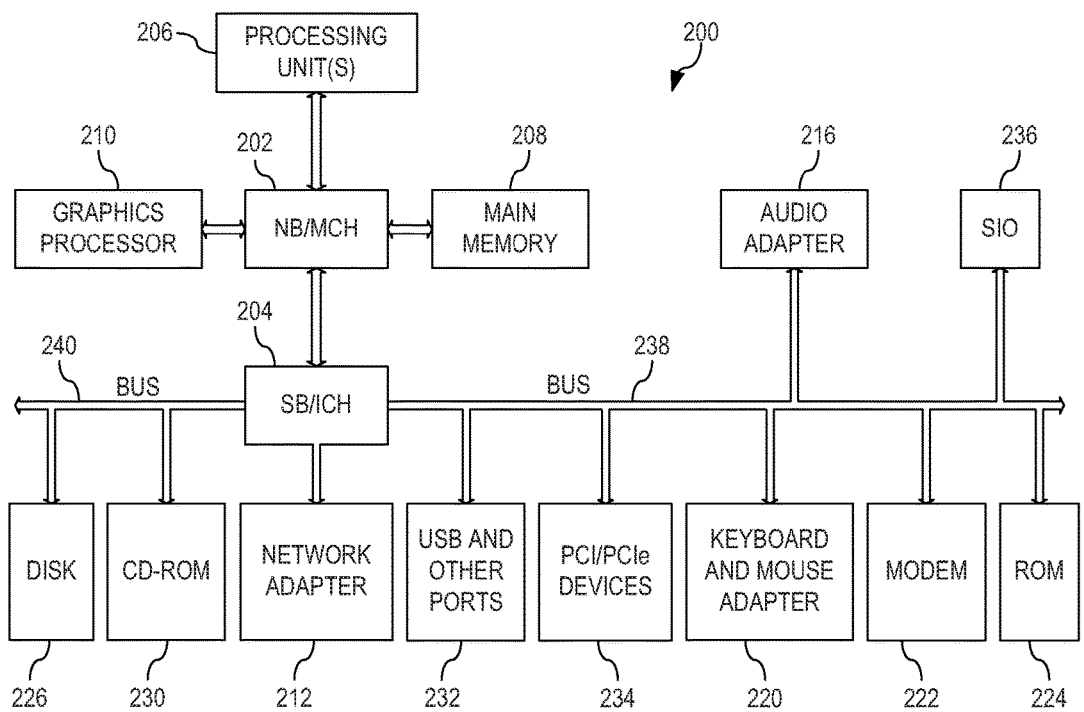
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement a storage management mechanism that manages inconsistencies in a storage system. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates managing inconsistencies in a storage system.

As noted above, the mechanisms of the illustrative embodiments utilize specifically configured computing devices, or data processing systems, to perform the operations for managing inconsistencies in a storage system. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System P® computer system, Power™ processor based computer system, or the like, running the Advanced Interactive Executive (AIX®) operating system or the LINUX operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to a storage management mechanism that manages inconsistencies in a storage system.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
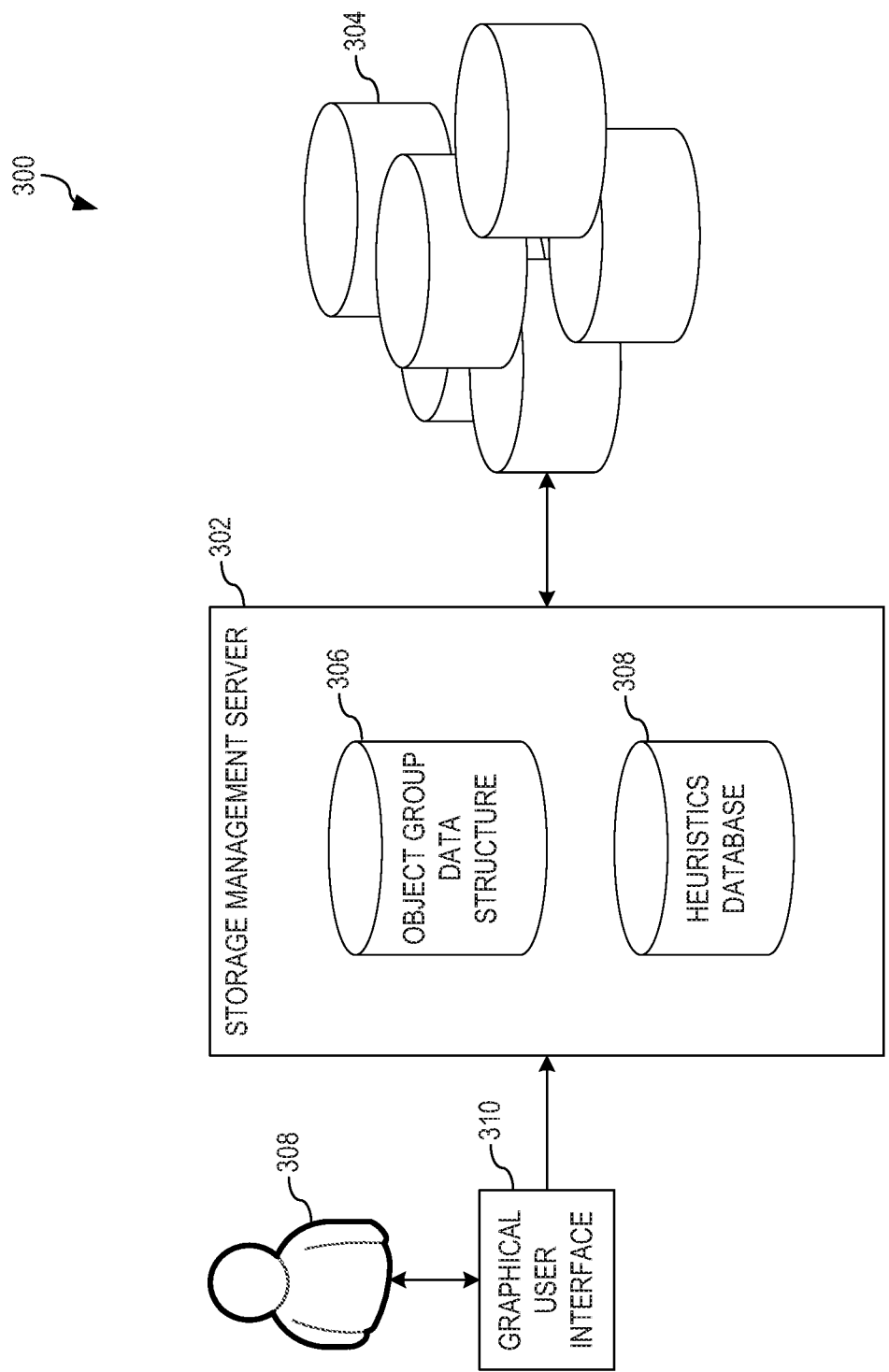
FIG. 3 depicts an exemplary functional block diagram of a mechanism for managing inconsistencies in a storage system in accordance with an illustrative embodiment.

FIG. 3 depicts an exemplary functional block diagram of a mechanism for managing inconsistencies in a storage system in accordance with an illustrative embodiment. Data processing system 300 comprises storage management server 302 coupled to a set of storage devices 304. Each storage device in the set of storage devices 304 may be considered to be a single object or a set of objects, where each object has a set of characteristics such as, for example, where the object is mirrored to, which host the object is mapped to, which consistency group the object is associated with, a snapshot interval of the object, a snapshot rotation of the object, or the like. That is, if a storage device is a single data structure or volume, then the entire storage device may be considered as a single object. Conversely, if a storage device is divided into multiple volumes, then each individual volume may be considered an object.

Storage management server 302 operates in two different modes: monitoring of groups of objects already created and analyzing objects to be added to a group, each of which are described as follows. For those groups of objects already created with groupings identified in object group data structure 306, storage management server 302 polls for changes to each object within the set of storage devices 304. The polling identifies changes made to the objects since the last poll and identities similarities between objects base on prefix and/or suffix naming parameters, which generates the initial object groupings. For each object in a selected object group, storage management server 302 identifies a set of characteristics associated with the object such as: where the object is mirrored to, which host the object is mapped to, which consistency group the object is associated with, a snapshot interval of the object, a snapshot rotation of the object, or the like.

If storage management server 302 finds inconsistency of characteristics between one object and other objects in the same object group, storage management server 302 performs an analysis to identify another object group with similar characteristics to the object. In accordance with the illustrative embodiments, similar characteristics is identified when a predetermined percentage of the characteristics of the object match the characteristics of the object group, with a higher percentage indicating a better match. If storage management server 302 finds an object group with similar characteristics, storage management server 302 generates a notification to administrator 308 of storage management server 302 via a graphical user interface (GUI) 310 indicating that there may be a violation, an identification of the object group the object is currently associated with, and an indication of one or more object groups the object could be associated with, including percentage of match with each object group in the one or more object groups.

Based on the notification, administrator 308 may choose to perform one or more actions, such as:
1. Act to move the object to one of the one or more object groups.
2. Act to leave the object in the current object group and do nothing.
3. Act to leave the object in the current object group and ignore the characteristics of the object.
4. Act to leave the object in the current object group and ignore the characteristics of the object group with which the object is associated.
5. Act to ignore the characteristics of the current object group and exclude adding any more objects to the current object group.
6. Act to ignore one or more characteristics of the object in future analysis.
7. Act to ignore one or more characteristics of the object group in future analysis.

Based on the specific action selected by administrator 308, storage management server 302 acts to make appropriate changes to the object and one or more object groups, if warranted. Storage management server 302 then records the action in heuristics database 312. Utilizing heuristics data structure 312, storage management server 302 may "learn" how to address objects that are identified as being inconsistent with the object group they are currently associated. Thus, when storage management server 302 identified future object inconsistencies, storage management server 302 may utilize heuristics database 312 to identify when a particular type of object inconsistency requires administrator notification and when a particular type of object inconsistency may be ignored.

In the second mode of operation, for an object that is newly created and is to be added to an object group, storage management server 302 identifies a set of characteristics associated with the object such as: where the object is to be mirrored to, which host the object is to be mapped to, a snapshot interval of the object, a snapshot rotation of the object, or the like. Storage management server 302 then performs an analysis to identify another object group with similar characteristics to the object. In accordance with the illustrative embodiments, similar characteristics is identified when a predetermined percentage of the characteristics of the object match the characteristics of the object group, with a higher percentage indicating a better match. If storage management server 302 finds an object group with similar characteristics, storage management server 302 generates a notification to administrator 308 of storage management server 302 via GUI 310 indicating one or more object groups the object could be associated with, including percentage of match with each object group in the one or more object groups.

Based on the notification, administrator 308 provides either a selection of the one or more object groups provided with the notification or an indication of another object group to which the object is to be associated. Based on the specific action selected by administrator 308, storage management server 302 acts to place the object in the identified object group. Storage management server 302 then records the action in heuristics database 312. Utilizing heuristics data structure 312, storage management server 302 may "learn" how to address new objects with similar characteristics to that object when they are to be added to a object group.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
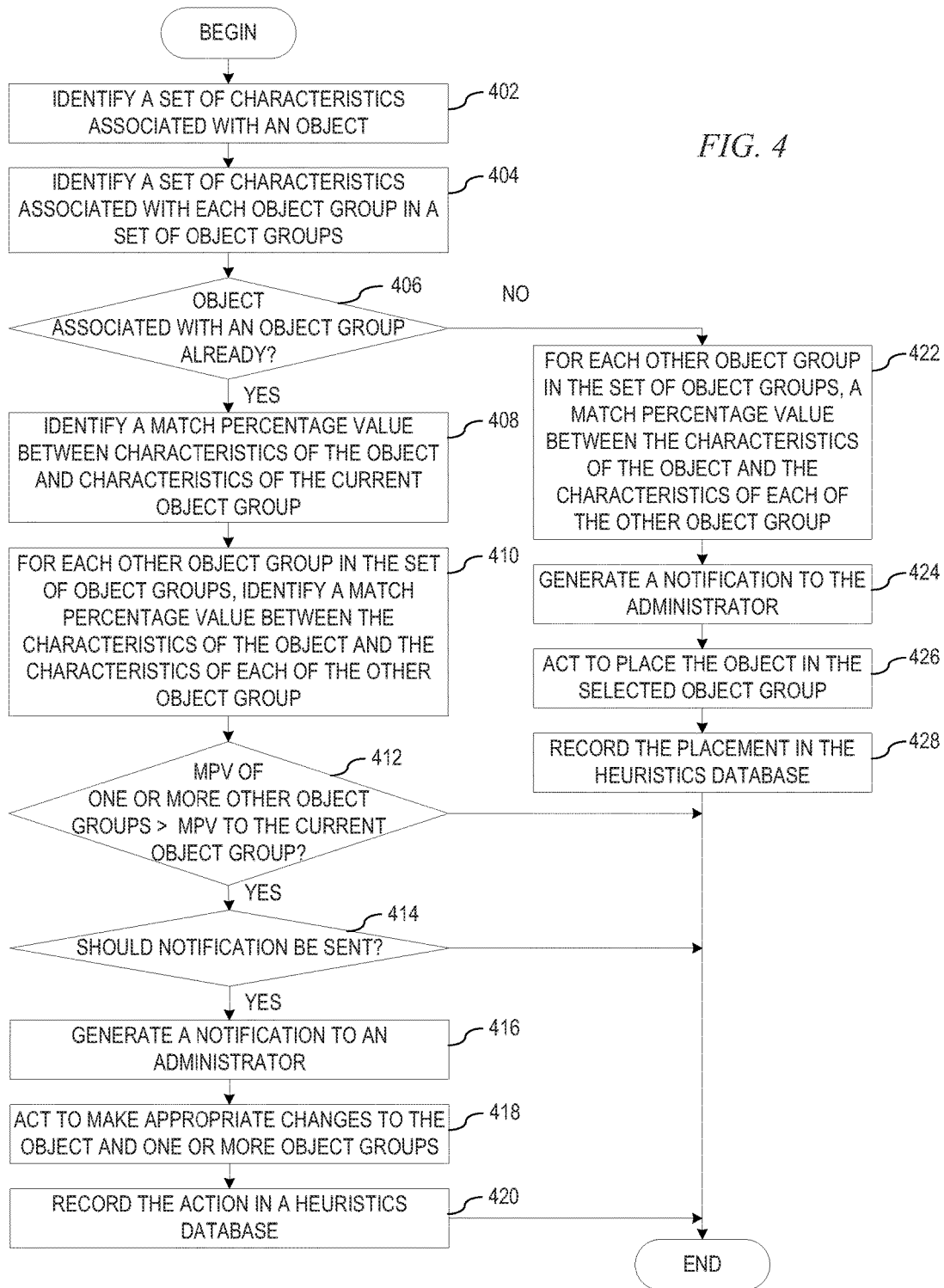
FIG. 4 depicts an exemplary flowchart of the operations performed by a mechanism for managing inconsistencies associated with an object in a storage system in accordance with an illustrative embodiment.

FIG. 4 depicts an exemplary flowchart of the operations performed by a mechanism for managing inconsistencies associated with an object in a storage system in accordance with an illustrative embodiment. The following operations are shown for one object, but in accordance with the illustrative embodiment, the operation is repeated for each object in the storage system. As the operation begins, a storage management server identifies a set of characteristics associated with an object (step 402), the set of characteristics being, for example, where the object is mirrored to, which host the object is mapped to, which consistency group the object is associated with, a snapshot interval of the object, a snapshot rotation of the object, or the like. The storage management server then identifies a set of characteristics associated with each object group in a set of object groups (step 404). The storage management server then determines whether the object is already associated with an object group in the set of object groups (step 406).

If at step 406 the object is already associated with an object group, the storage management device identifies a match percentage value between the characteristics of the object and the characteristics of the current object group (step 408). The storage management server also identifies, for each other object group in the set of object groups, a match percentage value between the characteristics of the object and the characteristics of each of the other object group (step 410). The storage management server then determines whether a match percentage value of one or more other object groups in the set of other object groups is higher than the match percentage value between the characteristics of the object and the characteristics of the current object group (step 412). If at step 412 the match percentage value of one or more other object groups in the set of other object groups fails to be higher than the match percentage value between the characteristics of the object and the characteristics of the current object group, the operation terminates.

If at step 412 the match percentage value of one or more other object groups in the set of other object groups is higher than the match percentage value between the characteristics of the object and the characteristics of the current object group, the storage management server analyzes a heuristics database to determine whether a notification should be sent based on past actions implemented by the administrator (step 414). If at step 414 the past actions of other objects similar to the current object indicate that no notification should be sent, the operation terminates. If at step 414 no similarity can be identified or the past actions of other objects similar to the current object indicate that a notification should be sent, the storage management server generates a notification to an administrator of storage management server (step 416) via a graphical user interface (GUI) indicating that there may be a violation, an identification of the object group the object is currently associated with, and an indication of one or more object groups the object could be associated with, including percentage of match with each object group in the one or more object groups.

Based on the notification, the administrator may choose to perform one or more actions, such as:
1. Act to move the object to one of the one or more object groups.
2. Act to leave the object in the current object group and do nothing.
3. Act to leave the object in the current object group and ignore the characteristics of the object.
4. Act to leave the object in the current object group and ignore the characteristics of the object group with which the object is associated.
5. Act to ignore the characteristics of the current object group and exclude adding any more objects to the current object group.
6. Act to ignore one or more characteristics of the object in future analysis.
7. Act to ignore one or more characteristics of the object group in future analysis.

Responsive to receiving a specific action selected by the administrator, the storage management server acts to make appropriate changes to the object and one or more object groups, if warranted (step 418). The storage management server then records the action in a heuristics database (step 420), with the operation terminating thereafter.

If at step 406 the object fails to be already associated with an object group (i.e. a new object), the storage management device identifies, for each other object group in the set of object groups, a match percentage value between the characteristics of the object and the characteristics of each of the other object group (step 422). In accordance with the illustrative embodiments, similar characteristics is identified when a predetermined percentage of the characteristics of the object match the characteristics of the object group, with a higher percentage indicating a better match. The storage management server then generates a notification to the administrator of the storage management server via a GUI indicating one or more object groups the object could be associated with, including percentage of match with each object group in the one or more object groups (step 424).

Based on the notification, the administrator provides either a selection of the one or more object groups provided with the notification or an indication of another object group to which the object is to be associated. Based on the specific object group selected by the administrator, the storage management server acts to place the object in the selected object group (step 426). The storage management server then records the placement in the heuristics database (step 428), with the operation terminating thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams anchor flowchart illustration, can be implemented by special purpose hardware-based systems that perform the specified functions or acts or carry out combinations of special purpose hardware and computer instructions.

Thus, the illustrative embodiments provide mechanisms for mechanisms for managing inconsistencies in a storage system. In the illustrative embodiments, the mechanism check for numerous characteristics associated with the object either prior to the object being grouped or to identify an object that has been grouped incorrectly. The mechanisms identify characteristics such as, for example, where the object is mirrored to, which host the object is mapped to, which consistency group the object is associated with, a snapshot interval of the object, a snapshot rotation of the object, or the like. Based on one or more of these characteristics, the mechanisms identify grouped objects that have the same characteristics—like all mirrored to the same place, all mapped to the same host, all in the same CG, all have the same snapshot interval, all have the same snapshot rotation, or the like. If the object is currently being grouped, the mechanisms provide the administrator with an indication of which object group best coincides with the characteristics of the object. If the object is already grouped by incorrectly, then the mechanisms provide an alert to an administrator indicating a policy violation as well as an indication of which object group best coincides with the characteristics of the object.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for managing inconsistencies associated with an object in a storage system, the method comprising:
   determining whether the object is already associated with a current object group in a plurality of object groups, each object group in the plurality of object groups comprising a plurality of objects grouped together based a set of characteristics pertaining to the objects in that object group;
   responsive to the object already being associated with the current object group:
      identifying a match percentage value between characteristics in a set of characteristics associated with the object and characteristics in a set of characteristics of other objects in the current object group; and
      for each other object group in the plurality of object groups, identifying a match percentage value between characteristics in the set of characteristics associated with the object and characteristics in a set of characteristics of objects in each of the other object groups;
   determining whether the match percentage value between the characteristics associated with the object and the characteristics of the objects in one or more other object groups in the plurality of other object groups is higher than the match percentage value between the characteristics associated with the object and the characteristics of other objects in the current object group;
   responsive to the match percentage value between the characteristics associated with the object and the characteristics of the objects in the one or more other object groups in the plurality of other object groups being higher than the match percentage value between the characteristics associated with the object and the characteristics of the other objects in the current object group,
   implementing an action to move the object from the current object group to one of the one or more object groups; and
   recording the action in a heuristics database.

2. The method of claim 1, further comprising:
   analyzing heuristics in the heuristics database to determine whether a notification should be sent based on past implemented actions; and
   responsive to the past implemented actions of other objects similar to the object indicating that no notification should be sent, ignoring the inconsistency.

3. The method of claim 1, further comprising:
   analyzing heuristics in the heuristics database to determine whether a notification should be sent based on past implemented actions; and
   responsive to the past implemented actions of other objects similar to the object indicating that a notification should be sent, generating the notification to an administrator of the storage system.

4. The method of claim 1, further comprising:
   responsive to the object failing to already be associated with an object group:
      for each other object group in the plurality of object groups, identifying a match percentage value between the characteristics associated with the object and the characteristics of objects in each of the other object group;
      generating a notification to an administrator of the storage system indicating one or more object groups the object could be associated with, including a percentage of match with each object group in the one or more object groups;
responsive to receiving a selected object group from the administrator, placing the object in the selected object group; and
recording the placement in the heuristics database.

5. The method of claim 1, wherein the characteristics in the set of characteristics associated with the object are where the object is mirrored to, which host the object is mapped to, which consistency group the object is associated with, a snapshot interval of the object, or a snapshot rotation of the object.

6. The method of claim 1, wherein the notification includes one or more of an indication that there may be a violation, an identification of the object group the object is currently associated with, and an indication of one or more object groups the object could be associated with, including percentage of match with each object group in the one or more object groups.

7. A computer program product comprising a computer readable storage medium having a computer readable program for managing inconsistencies associated with an object in a storage system stored therein, wherein the computer readable program, when executed on a computing device, causes the computing device to:
determine whether the object is already associated with a current object group in a plurality of object groups, each object group in the plurality of object groups comprising a plurality of objects grouped together based a set of characteristics pertaining to the objects in that object group;
responsive to the object already being associated with the current object group:
  identify a match percentage value between characteristics in a set of characteristics associated with the object and characteristics in a set of characteristics of other objects in the current object group; and
  for each other object group in the plurality of object groups, identify a match percentage value between characteristics in the set of characteristics associated with the object and characteristics in a set of characteristics of objects in each of the other object groups;
determine whether the match percentage value between the characteristics associated with the object and the characteristics of the objects in one or more other object groups in the plurality of other object groups is higher than the match percentage value between the characteristics associated with the object and the characteristics of other objects in the current object group;
responsive to the match percentage value between the characteristics associated with the object and the characteristics of the objects in the one or more other object groups in the plurality of other object groups being higher than the match percentage value between the characteristics associated with the object and the characteristics of the other objects in the current object group,
implement an action to move the object from the current object group to one of the one or more object groups; and
record the action in a heuristics database.

8. The computer program product of claim 7, wherein the computer readable program further causes the computing device to:
analyze heuristics in the heuristics database to determine whether a notification should be sent based on past implemented actions; and
responsive to the past implemented actions of other objects similar to the object indicating that no notification should be sent, ignore the inconsistency.

9. The computer program product of claim 7, wherein the computer readable program further causes the computing device to:
analyze heuristics in the heuristics database to determine whether a notification should be sent based on past implemented actions; and
responsive to the past implemented actions of other objects similar to the object indicating that a notification should be sent, generate the notification to an administrator of the storage system.

10. The computer program product of claim 7, wherein the computer readable program further causes the computing device to:
responsive to the object failing to already be associated with an object group:
  for each other object group in the plurality of object groups, identify a match percentage value between the characteristics associated with the object and the characteristics of objects in each of the other object group;
  generate a notification to an administrator of the storage system indicating one or more object groups the object could be associated with, including a percentage of match with each object group in the one or more object groups;
  responsive to receiving a selected object group from the administrator, place the object in the selected object group; and
  record the placement in the heuristics database.

11. The computer program product of claim 7, wherein the characteristics in the set of characteristics are where the object is mirrored to, which host the object is mapped to, which consistency group the object is associated with, a snapshot interval of the object, or a snapshot rotation of the object.

12. The computer program product of claim 7, wherein the notification includes one or more of an indication that there may be a violation, an identification of the object group the object is currently associated with, and an indication of one or more object groups the object could be associated with, including percentage of match with each object group in the one or more object groups.

13. An apparatus for managing inconsistencies associated with an object in a storage system comprising:
a processor; and
a memory coupled to the processor, wherein the memory comprises instructions which, when executed by the processor, cause the processor to:
determine whether the object is already associated with a current object group in a plurality of object groups, each object group in the plurality of object groups comprising a plurality of objects grouped together based a set of characteristics pertaining to the objects in that object group;
responsive to the object already being associated with the current object group:
  identify a match percentage value between characteristics in a set of characteristics associated with the object and characteristics in a set of characteristics of other objects in the current object group; and for each other object group in the plurality of object groups, identify a match percentage value between characteristics in the set of characteristics associated with the object and characteristics in a set of characteristics of objects in each of the other object groups;

determine whether the match percentage value between the characteristics associated with the object and the characteristics of the objects in one or more other object groups in the plurality of other object groups is higher than the match percentage value between the characteristics associated with the object and the characteristics of other objects in the current object group;

responsive to the match percentage value between the characteristics associated with the object and the characteristics of the objects in the one or more other object groups in the plurality of other object groups being higher than the match percentage value between the characteristics associated with the object and the characteristics of the other objects in the current object group, implement an action to move the object from the current object group to one of the one or more object groups; and record the action in a heuristics database.

14. The apparatus of claim 13, wherein the instructions further cause the processor to:

analyze heuristics in the heuristics database to determine whether a notification should be sent based on past implemented actions; and responsive to the past implemented actions of other objects similar to the object indicating that no notification should be sent, ignore the inconsistency.

15. The apparatus of claim 13, wherein the instructions further cause the processor to:

analyze heuristics in the heuristics database to determine whether a notification should be sent based on past implemented actions; and responsive to the past implemented actions of other objects similar to the object indicating that a notification should be sent, generate the notification to an administrator of the storage system.

16. The apparatus of claim 13, wherein the instructions further cause the processor to:

responsive to the object failing to already be associated with an object group:

for each other object group in the plurality of object groups, identify a match percentage value between the characteristics associated with the object and the characteristics of objects in each of the other object group;

generate a notification to an administrator of the storage system indicating one or more object groups the object could be associated with, including a percentage of match with each object group in the one or more object groups;

responsive to receiving a selected object group from the administrator, place the object in the selected object group; and record the placement in the heuristics database.

17. The apparatus of claim 13, wherein the characteristics in the set of characteristics are where the object is mirrored to, which host the object is mapped to, which consistency group the object is associated with, a snapshot interval of the object, or a snapshot rotation of the object; and wherein the notification includes one or more of an indication that there may be a violation, an identification of the object group the object is currently associated with, and an indication of one or more object groups the object could be associated with, including percentage of match with each object group in the one or more object groups.

* * * * *